US008868631B2

(12) United States Patent
Pham et al.

(10) Patent No.: US 8,868,631 B2
(45) Date of Patent: Oct. 21, 2014

(54) METHOD FOR PROCESSING A SIGNAL, IN PARTICULAR A DIGITAL AUDIO SIGNAL

(75) Inventors: Hong Cong Tuyen Pham, Lille (FR); Raphael Greff, Loos (FR); Paul Allais, Lille (FR)

(73) Assignee: A-Volute, Villeneuve D'Ascq (FR)

( * ) Notice: Subject to any disclaimer, the term of this patent is extended or adjusted under 35 U.S.C. 154(b) by 759 days.

(21) Appl. No.: 13/130,988

(22) PCT Filed: Nov. 25, 2009

(86) PCT No.: PCT/FR2009/001342
§ 371 (c)(1),
(2), (4) Date: Aug. 8, 2011

(87) PCT Pub. No.: WO2010/061076
PCT Pub. Date: Jun. 3, 2010

(65) Prior Publication Data
US 2012/0020443 A1      Jan. 26, 2012

(30) Foreign Application Priority Data
Nov. 25, 2008   (FR) ..................................... 08 06608

(51) Int. Cl.
*G06F 15/00*       (2006.01)
*G06F 17/15*       (2006.01)
(52) U.S. Cl.
CPC .................................... *G06F 17/156* (2013.01)
USPC ........................................................ 708/404
(58) Field of Classification Search
CPC ..... G06F 17/142; G06F 7/768; G06F 17/141; H04L 27/265; H04L 27/2628
USPC ........................................................ 708/404
See application file for complete search history.

(56) References Cited

U.S. PATENT DOCUMENTS

| 6,704,438 | B1* | 3/2004 | Alexandru | 708/404 |
| 8,351,525 | B2* | 1/2013 | Wang et al. | 708/404 |
| 2006/0140291 | A1 | 6/2006 | Thomas, Jr. | |

FOREIGN PATENT DOCUMENTS

WO    WO 2007/110519 A2    10/2007

OTHER PUBLICATIONS

J J Lopez et al., PC Based Real-Time Multichannel Convolver for Ambiophonic Reproduction, AES 19TH International Conference on Surround Sound, Schloss Elmau, Germany, Jun. 21-24, 2001, [Online] 2001, URL: http://www.aurora-plugins.com/Public/AES-19/Ambiovolver/Jos%C3%83%C2%A8_Papers/00037.pdf>.

(Continued)

*Primary Examiner* — Tan V. Mai
(74) *Attorney, Agent, or Firm* — Blakely Sokoloff Taylor & Zafman

(57) ABSTRACT

The invention relates to a method for processing a signal, in particular a digital audio signal, suitable for being implemented by a digital signal processor (DSP) having libraries for calculating Fourier transforms from the complex number space to the complex number space, for digitally processing P input signals, P being an integer at least equal to 2, more particularly for filtering said P input signals by the convolution of sampled fast Fourier transforms (FFT), thus obtaining Q output signals, Q being an integer at least equal to 2. According to the invention, the method includes at least the following steps: —grouping said P input signals by twos, one representing the real portion and the other the imaginary portion of a complex number, thus defining one or more input vectors, —filtering said input vector or vectors, passing through the Fourier space, thus generating one or more output vectors, which are complex numbers, the real portion and the imaginary portion of said vector or each one of said output vectors respectively representing one of said Q output signals.

8 Claims, 4 Drawing Sheets

(56) References Cited

OTHER PUBLICATIONS

Figure 1:
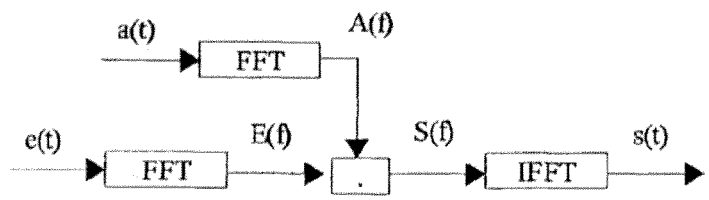

E O Brigham, The Fast Fourier Transform and its Applications, 1988, Prentice-Hall Inc.

A Farina et al., Software Implentation of an MLS Analyzer, with Tools for Convolution, Auralization, and Inverse Filming, Pre-Prints of the 103rd AES Convention, New York, Sep. 26-29, 1997, [Online] 1997, URL: http://pcfarina.eng.unipr.it/Public/Papers/097-AES97.PDF>.

U Meyer-Baese, Digital Signal Processing with Field Programmable Gate Arrays (Third Edition), 2007, pp. 347 and 349, Springer-Verlag.

W H Press et al., Numerical Recipes in C (Second Edition), 1992, Cambridge University Press, pp. 510-514 and 542-544.

Y P Que et al., Rendering Models for immersive Voice Communications within Distributed Virtual Environment, IEEE, International Region 10 Conference (Tencon 2005), Melbourne, Australia, Nov. 21-24, 2005, 2005.

\* cited by examiner

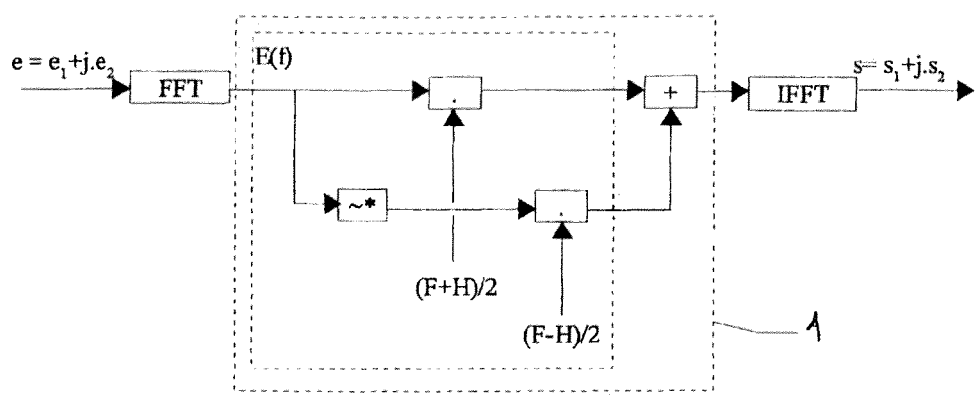
Fig. 4 (INV)

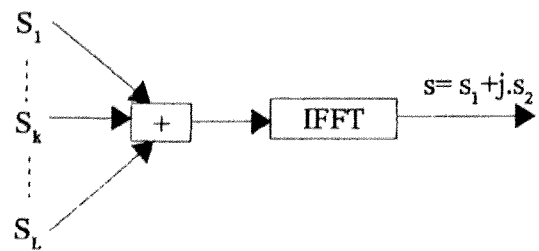
Fig. 5 (INV)
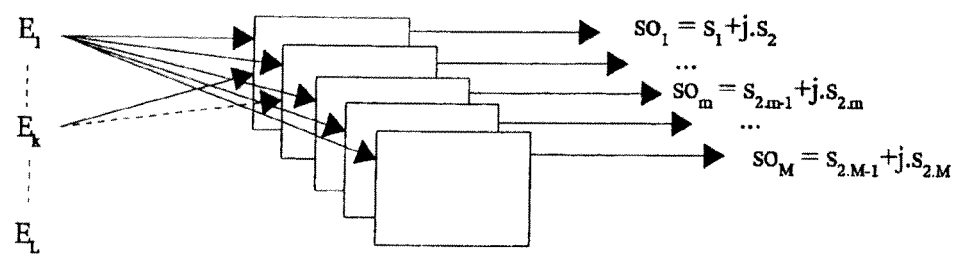
Fig. 6 (INV)

METHOD FOR PROCESSING A SIGNAL, IN PARTICULAR A DIGITAL AUDIO SIGNAL

This is a non-provisional application claiming the benefit of International Application Number PCT/FR2009/001342 filed Nov. 25, 2009.

The invention relates to a method for processing a digital audio signal as well as to a digital signal processor programmed for applying the method.

The invention will find a particular application for digital signal processors (DSP) having libraries for calculating Fourier Transforms from complex number space to complex number space.

The field of the invention is that of digital audio signal processing.

The calculation of a Fourier Transform of a real signal results in coefficient redundancy. This redundancy is used by certain algorithms for limiting the number of calculations and for carrying out this operation more rapidly. Such algorithms are notably known from documents WO-01/33411, US-2002/0083107 or further US-2006/0140291. Certain of these algorithms require function libraries with which very fast real calculations of Fourier Transforms may be performed while optimizing the calculations according to the hardware capacities of the machines. However, most present DSPs do not have such libraries and only have fast Fourier Transforms (FFTs) for complex numbers, i.e. from complex number space to complex number space.

The object of the present invention is to propose an alternative to the methods of the state of the art with which true computational burden may be reduced for filtering operations by convolution of fast Fourier Transforms.

Another object of the invention is to propose such a method, particularly suitable for DSPs having libraries for FFT calculations from complex number space to complex number space.

Other objects and advantages of the present invention will become apparent during the description which follows, which is only given as an indication and does not have the purpose of limiting it.

The invention first of all relates to a method for processing a digital audio signal, in order to achieve spatialization of sound, said method being applied by a digital signal processor (DSP) having libraries for calculating Fourier Transforms from complex number space to complex number space, for digital processing of P input signals, P being an integer greater than or equal to 2, for filtering said P input signals by the convolution of sampled Fast Fourier Transforms (FFTs), thereby obtaining Q output signals, Q being an integer greater than or equal to two.

According to the invention, the method comprises at least the following steps:

grouping said P input signals by twos, one representing the real portion, the other the imaginary portion of a complex number, thereby defining one or more input vectors, carrying out the filtering on said input vector(s) by passing through Fourier space, thereby generating one or more complex output vectors, the real portion and the imaginary portion of said or each of said output vectors respectively representing one of said Q output signals.

Figure 2:
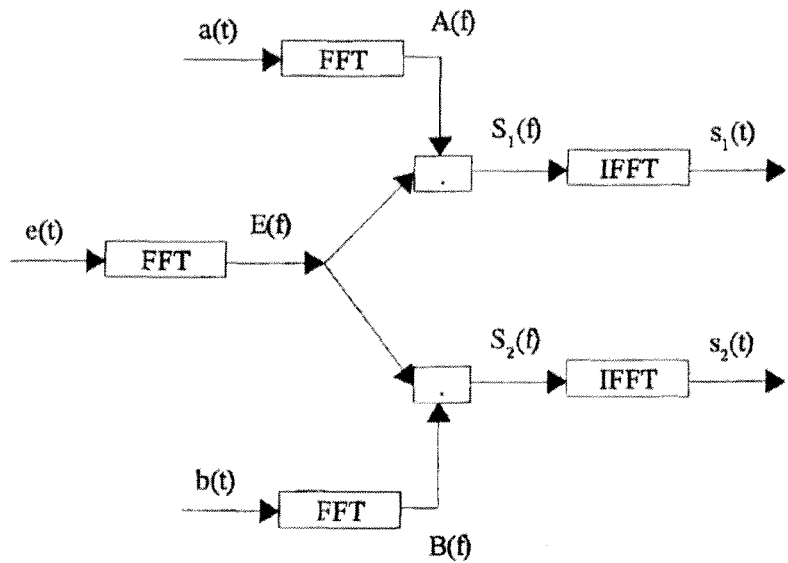
Figure 3:
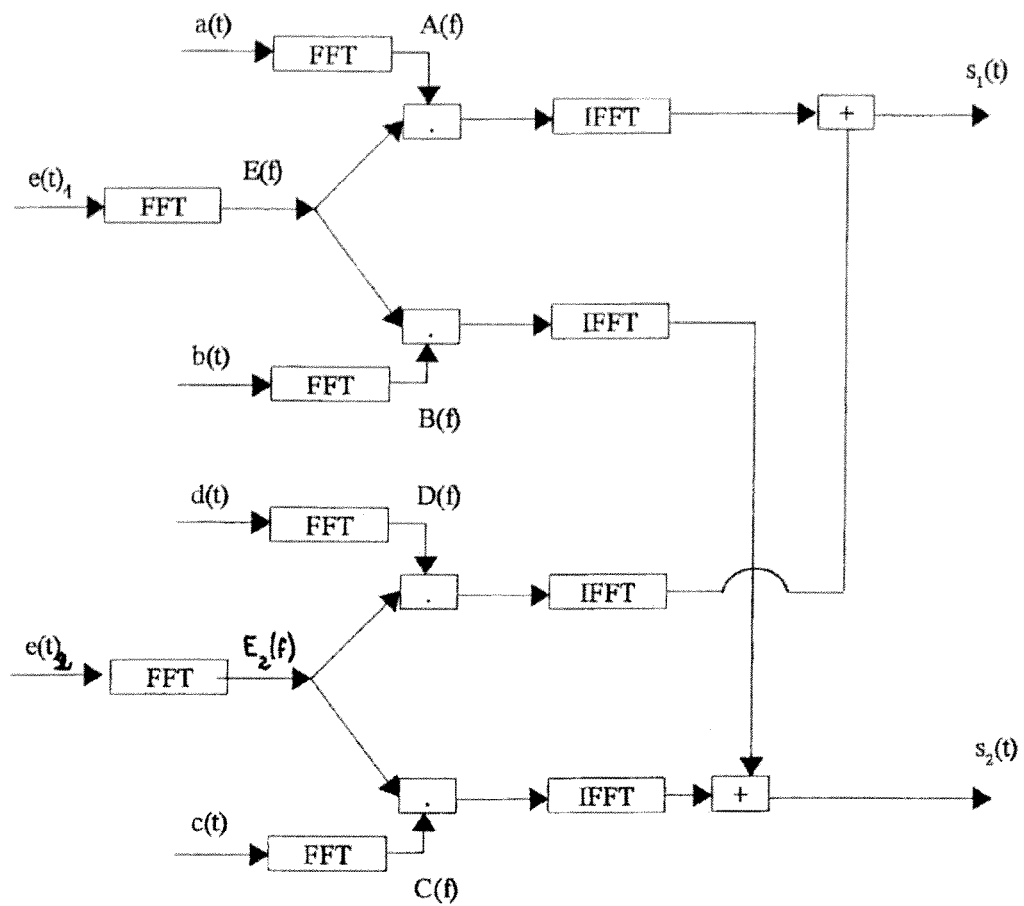

The invention will be better understood upon reading the following description accompanied by the appended figures wherein:

FIG. 1 is a schematic diagram illustrating filtering by the convolution of Fast Fourier Transforms of an input signal in order to obtain an output signal, according a non-optimized algorithm of the state of the art (case of one input, one output), FIG. 2 illustrates filtering by the convolution of Fast Fourier Transforms of an input signal in order to obtain two output signals according to a non-optimized algorithm of the state of the art (case of one input, two outputs), FIG. 3 is a schematic diagram illustrating filtering by the convolution of Fast Fourier Transforms of two input signals in order to obtain two output signals according to a non-optimized algorithm of the state of the art (case of two inputs, two outputs), FIG. 4 is a schematic diagram illustrating the processing method according to the invention, for the filtering of two input signals in order to obtain two output signals (P=2, Q=2), FIG. 5 is a schematic diagram illustrating the generalization of the method according to the invention as illustrated in FIG. 4 for filtering a number of signals P strictly greater than 2, an integer such that P=2×L with L an integer (P=2L, Q=2), FIG. 6 is a schematic diagram illustrating the generalization of the method according to the invention as illustrated in FIG. 5 wherein P is greater than or equal to 2, an even integer such that P=2L with L an integer and Q strictly greater than 2, an even integer such that Q=2M with M an integer (P=2L, Q=2M).

First of all, we begin by describing filtering by convolution of Fourier Transforms, which is not optimized, according to the state of the art, more particularly the following cases:

a) an input signal towards one output, b) an input signal towards two outputs, c) two input signals towards two output signals (spatialization of two sources on a stereo output).

Case a): one input signal→one output signal (digital filtering)

This case is illustrated in the diagram of FIG. 1.

Let e(t) be a signal which is desirably to be convolved with a signal a(t).

a(t) is the impulse response to be applied let the filter be $A(f)=FFT[(a(t))]$ let $E(f)=FFT[e(t)]$ We therefore have the resulting signal from the outputs:

$$s(t)=e(t)\otimes a(t)=IFFT[E(f)\cdot A(f)]=IFFT[FFT(e(t))\cdot FFT(a(t))]$$

Wherein FFT is the Fast Fourier Transform and IFFT is the inverse Fast Fourier Transform.

This filtering may be used on a window of size N. By using standard overlap-add or overlap-save techniques, e(t) may be replaced with $e(t)_N$ corresponding to the samples taken on the window of size N and FFT with $FFT_N$ which is the Fast Fourier Transform on N samples.

The computing time depends for this type of operation essentially on the number of FFTs or IFFTs to be computed.

By taking the FFT as a time unit, and by assuming as a simplifying assumption that the computing time of an FFT is equivalent to that of an IFFT, the computing time is 3 FFT.

Case b): 1 input signal→two output signals (example: spatialization of a source on a stereo output).

This case is illustrated in the diagram of FIG. 2.

Let us define the following filters:

a direct filter a(t), an indirect filter (b(t),

The output signals are therefore $s_1$ and $s_2$ such that:

$$S_1(f)=FFT[s_1(t)]=E(f)\cdot A(f)$$

$$S_2(f)=FFT[s_2(t)]=E(f)\cdot B(f)$$

By taking FFT as a time unit, the computing time is 5 FFT.
Case c): two input signals→two output signals (application example: specialization of two sources on a stereo output)

This case is illustrated in the diagram of FIG. 3.

Let $e_1$ be an input signal and $e_2$ an input signal.

Let us define the following filters a, b, d, c, such that:

$$\begin{pmatrix} s_1(t) \\ s_2(t) \end{pmatrix} = \begin{pmatrix} a(t) & d(t) \\ b(t) & c(t) \end{pmatrix} \otimes \begin{pmatrix} e_1 \\ e_2 \end{pmatrix}$$

The output signals are therefore $s_1$ and $s_2$ such that:

$$S_1(t) = \text{IFFT}[A(f) \cdot E_1(f)] + \text{IFFT}[D(f) \cdot E_2(f)].$$

$$S_2(t) = \text{IFFT}[B(f) \cdot E_1(f)] + \text{IFFT}[C(f) \cdot E_2(f)].$$

By taking FFT as a time unit, the computing time is here 10 FFT.

Certain digital signal processors which we call a DSP for "Digital Signal Processor" may have a large amount of memory on board. The filters A(f), B(f), D(f), C(f) may then be stored in phase space (further called Fourier space or frequency space), which takes up twice as much memory on the DSP than if they were stored in time space, i.e. in their form a(t), b(t), d(t), c (t). Thus 4 FFT are saved. The computing time may then be reduced to 6 FFT.

The invention relates to a method for processing a digital audio signal in order to produce spatialization of sound, said method being applied by a digital signal processor (DSP) having libraries for calculating Fourier transforms from complex number space to complex number space, for digital processing of P input signals, P being an integer greater or equal to 2, for the filtering of said P input signals by the convolution of sampled fast Fourier transforms (FFT), thereby obtaining Q output signals, Q being an integer greater than or equal to 2.

According to the invention, the method comprises at least the following steps:

grouping said P input signals by twos, one representing the real portion, the other one the imaginary portion of a complex number, thereby defining one or several input vectors, performing filtering on said input vector(s) by passing through Fourier space, thereby generating one or more complex output vectors, the real portion and the imaginary portion of said or of each of said output vectors respectively representing one of said Q output signals.

Said or each of said output vectors may be obtained in the following way:

(1) a filtering operator is applied on said input vector, in the case when P=2, thereby giving a result or if necessary, according to another alternative, in the case when P>2, on each of said input vectors, thereby giving several intermediate results, (2) in the case when P>2, said intermediate results obtained in the previous step are summed in Fourier space.

(3) the result of step (1) or (2) is subject to an output vector.

Various embodiments of the invention will be described subsequently, and more particularly the following cases:

1) two input signals→2 output signals (P=2, Q=2),
2) 2.L input signals→2 output signals (P=2.L, Q=2),
3) 2.L input signals→2.M output signals (P=2.L, Q=2.M),
4) 2.L+1 input signals→2.M+1 output signals (P=2.L+1, Q=2.M+1).

L and M are non-zero natural integers greater than or equal to 1.

The method thus consists of grouping the input signals by twos, one representing the real portion, the other one the imaginary portion of an input vector. Once it is in phase space, the input vector undergoes processing by a basic block referenced as 1.

With the method it is possible to considerably reduce the computing time as compared with non-optimized standard methods. The table below compares in FFT time units, the computing times between the method according to the invention and the non-optimized standard processing, and this for the different embodiments which will be developed subsequently.

For example, for spatialization of 64 input signals on quadraphony (L=32 and M=2), the method allows a reduction in the number of FFTs from 320 to 34.

| Case/computing time (in number of FFTs) | Standard processing | Standard processing and storage of the filters in phase space | Engine according to the invention and storage of the filters in phase space |
|---|---|---|---|
| 1) P = 2, Q = 2 | 10 | 6 | 2 |
| 2) P = 2.L, Q = 2 | 10.L | 6.L | L + 1 |
| 3) P = 2.L, Q = 2.M | 8.L.M | 4.L.M + 2.L | L + M |
| 4) P = 2.L + 1, Q = 2.M + 1 | 8.L.M + 6.L + 4.M + 3 | 8.L.M + 4.L + 2.M + 2 | L + M + 2 |

We shall now develop the various aforementioned embodiments:

Case 1): 2 input signals→2 output signals (P=2, Q=2):

This case is illustrated in the diagram of FIG. 4.

The following variables are defined:

$e_1(t)$ and $e_2(t)$ are said P input signals, $s_1(t)$ and $s_2(t)$ are said Q output signals.

a(t), b(t), c(t) and d(t) are filters defined such that:

$$\begin{pmatrix} s_1(t) \\ s_2(t) \end{pmatrix} = \begin{pmatrix} a(t) & d(t) \\ b(t) & c(t) \end{pmatrix} \otimes \begin{pmatrix} e_1 \\ e_2 \end{pmatrix}$$

wherein $\otimes$ is the convolution operator.

e0(t) is said input vector such that $e0(t) = e_1(t) + j \cdot e_2(t)$, s0(t) is said output vector such that $s0(t) = s_1(t) + j \cdot s_2(t)$.

Said filtering operator further called "basic block" referenced as 1 in FIG. 4 is such that:

$$S = \frac{F+H}{2} \cdot E + \frac{F-H}{2} \cdot \tilde{E}*$$

wherein:

* is the conjugate complex operator such that $(x+j \cdot y)^* = x - j \cdot y$, ~ is the operator for inverting indices such that $\tilde{E}(i) = E(N-i)$ and $\tilde{E}(0) = E(0)$ and E(f) = FFT(e0(t)), S(f) = FFT(s0(t)), $F(f) = \text{FFT}[a(t) + j \cdot b(t)]$, $H(f) = \text{FFT}[c(t) - j \cdot d(t)]$, The filtering diagram is illustrated in FIG. 4. By the invention, the method only requires 3 FFTs and one IFFT, or only one FFT and one IFFT if the filters $$\frac{(F+H)}{2} \text{ and } \frac{(F-H)}{2}$$

are stored in phase space. The computing time is therefore equivalent to 2 FFTs.

Case 2): 2.L input signals→2 output signals (P=2.L, Q=2)
This embodiment is particularly illustrated in FIGS. 4 and 5. P>2, an even integer such that P=2L, with L an integer, Q=2, The following variables are defined:
$e_1(t), \ldots, e_{2k-1}(t), e_{2k}(t), \ldots, e_{2L}(t)$, are said P input signals,
$s_1(t), s_2(t)$ are said Q output signals.
$\{a_k(t), b_k(t), c_k(t), d_k(t)\}$ is the set of filters defined such that $k \in [1 \text{ to } L]$ and:

$$\begin{pmatrix} s_1(t) \\ s_2(t) \end{pmatrix} = \sum_{k=1}^{L} \begin{pmatrix} a_k(t) & d_k(t) \\ b_k(t) & c_k(t) \end{pmatrix} \otimes \begin{pmatrix} e_{2k-1}(t) \\ e_{2k}(t) \end{pmatrix}$$

wherein ⊗ is the convolution operator.
$\{e0_k(t)\}$, such that $k \in [1 \text{ to } L]$ and
$e0_k(t) = e_{2k-1}(t) + j \cdot e_{2k}(t)$, is the set of input vectors,
s0(t) is said output vector such that
$s0(t) = s_1(t) + j \cdot s_2(t)$.

Said filtering operator associated with said source vector $e0_k(t)$ is such that:

$$S_k = \frac{F_k + H_k}{2} \cdot E_k + \frac{F - H}{2} \cdot \tilde{E}_k *$$

wherein:
* is the conjugate complex operator,
~ is the operator for inverting indices as defined earlier,
and $$E_k(f) = FFT(e0_k(t)),$$

$$\sum_{k=1}^{L} S_k(f) = FFT(s0(t)),$$

$$F_k(f) = FFT[a_k(t) + j \cdot b_k(t)],$$

$$H_k(f) = FFT[c_k(t) - j \cdot d_k(t)]$$

By using the basic block referenced as 1, it is possible to save on IFFTs by summing the $s_k$ in Fourier space (phase space). Once the summation is achieved, it is possible with a single IFFT to obtain the result s1 and s2 (FIG. 5).

Finally with this method, only L FFTs and 1 IFFT are required. The computing time is equivalent to L+1 FFTs.

Case 3): 2L input signals→2.M output signals (P=2.L, Q=2.M):

This case is illustrated in FIGS. 4, 5 and 6. P≥2, an even integer such that P=2L, with L an integer. Q>2, an even integer such that Q=2M, with M an integer. P may be strictly greater than 2.

The following variables are defined:
$e_1(t), \ldots, e_{2k-1}(t), e_{2k}(t), \ldots, e_{2L}(t)$, are said P input signals,
$s_1(t), \ldots, s_{2m-1}(t), s_{2m}(t), \ldots, s_{2M}(t)$, are said Q output signals.
$\{a_{m,k}(t), b_{m,k}(t), c_{m,k}(t), d_{m,k}(t)\}$ is the set of filters defined such that $m \in [1 \text{ to } M]$ and $k \in [1 \text{ to } L]$ and $$\begin{pmatrix} s_{2m-1}(t) \\ s_{2m}(t) \end{pmatrix} = \sum_{k=1}^{L} \begin{pmatrix} a_{m,k}(t) & d_{m,k}(t) \\ b_{m,k}(t) & c_{m,k}(t) \end{pmatrix} \otimes \begin{pmatrix} e_{2k-1}(t) \\ e_{2k}(t) \end{pmatrix}$$

wherein ⊗ is the convolution operator,
$\{e0_k(t)\}$, such that $k \in [1 \text{ to } L]$ and
$e0_k(t) = e_{2k-1}(t) + j \cdot e_{2k}(t)$, is the set of input vectors,
$\{s0_m(t)\}$, such that $m \in [1 \text{ to } M]$ and
$s0_m(t) = s_{2m-1}(t) + j \cdot s_{2m}(t)$, is the set of output vectors. Said filtering operator associated with said source vector $e0_k(t)$ and with said output vector $s0_m(t)$ is such that:

$$S_{m,k} = \frac{F_{m,k} + H_{m,k}}{2} \cdot E_k + \frac{F_{m,k} - H_{m,k}}{2} \cdot \tilde{E}_k *$$

wherein:
* is the conjugate complex operator,
~ is the operator for inverting indices as defined earlier,
and $$E_k(f) = FFT(e0_k(t)),$$

$$\sum_{k=1}^{L} S_{m,k}(f) = FFT(s0_m(t)),$$

$$F_{m,k}(f) = FFT[a_{m,k}(t) + j \cdot b_{m,k}(t)],$$

$$H_{m,k}(f) = FFT[c_{m,k}(t) - j \cdot d_{m,k}(t)]$$

This method amounts to applying M times the method applied in case 2, as illustrated in FIG. 6.

By using the basic block referenced as 1, this method requires L FFTs for each $E_k$ and M IFFTs for each $S0_k$ in the case when the filters are recorded in frequency form. The computing time is therefore equivalent to (L+M)FFTs.

Case 4: 2.L+1 signals→2.M+1 output signals (P=2.L+1, Q=2.M+1).

This case is processed by the method seen in case 3) by adding a zero input signal and a zero output signal. The computing time is therefore equivalent to L+M+2.

The generalization, P input signals, Q output signals, consists of reducing P and Q to the greater or equal even integer by adding a zero input signal and/or a zero output signal, depending on the case. For example, when P is an odd integer, a zero input signal is added so as to apply the method of case 2 or 3 on an even number of input signals. Also, when Q is an odd integer, a zero output signal is added so as to apply the method of case 3 on an even number of output signals.

Of course, the method is applied on sampled and windowed signals. These "overlap-save" or "overlap-add" methods known per se may be applied in order to avoid artefacts on the windowings. Cross-fade methods may be applied in order to avoid the artefacts upon changing a filter.

The invention will also relate to a digital signal processor (DSP) notably having libraries for calculating Fourier transforms from complex number space to complex number space and programmed for applying the method according to the invention.

Naturally, other embodiments might have been envisioned by the person skilled in the art without however departing from the scope of the invention as defined by the claims hereafter.

The invention claimed is:

1. A method for processing a digital audio signal for achieving spatialization of sound, said method being applied by a digital signal processor (DSP) having libraries for calculating Fourier transforms from complex number space to complex number space, for digital processing of P input signals, P being an integer equal to 2, for filtering said P input signals by the convolution of sampled fast Fourier transforms (FFT), thereby obtaining Q output signals, Q being an integer equal to 2, wherein the method comprises at least the following steps:

grouping said P input signals, one representing the real part, the other the imaginary part of a complex number, thereby defining at least one input vector, achieving filtering on said at least one input vector by passing through a Fourier space, thereby generating at least one complex output vector, the real portion and the imaginary portion of said at least one output vector representing one of said Q output signals respectively, and wherein said at least one output vector is obtained in the following way:

a filtering operator is applied on said input vector thereby giving a result, the result is subject to an inverse fast Fourier transform, thereby obtaining said at least one output vector, and wherein:

$e_1(t)$ and $e_2(t)$ are said input P input signals, $s_1(t)$ and $s_2(t)$ are said Q output signals, $a(t)$, $b(t)$, $c(t)$ and $d(t)$ are filters defined such that:

$$\begin{pmatrix} s_1(t) \\ s_2(t) \end{pmatrix} = \begin{pmatrix} a(t) & d(t) \\ b(t) & c(t) \end{pmatrix} \otimes \begin{pmatrix} e_1(t) \\ e_2(t) \end{pmatrix}$$

wherein $\otimes$ is the convolution operator,
$e0(t)$ is said input vector such that $e0(t) = e_1(t) + j \cdot e_2(t),$ $s0(t)$ is said output vector such that $s0(t) = s_1(t) + j \cdot s_2(t)$,
said filtering operator is such that:

$$S = \frac{F+H}{2} \cdot E + \frac{F-H}{2} \cdot \tilde{E}*$$

wherein:
* is the conjugate complex operator,
~ is the operator for inverting indices
and
E(f)=FFT(e0(t)),
S(f)=FFT(s0(t)),
F(f)=FFT[a(t)+j·b(t)],
H(f)=FFT[c(t)−j·d(t)],
wherein FFT designates the fast Fourier transform operator.

2. A method for processing a digital audio signal for achieving spatialization of sound, said method being applied by a digital signal processor (DSP) having libraries for calculating Fourier transforms from complex number space to complex number space, for digital processing of P input signals, P being an integer greater than 2, for filtering said P input signals by the convolution of sampled fast Fourier transforms (FFT), thereby obtaining Q output signals, Q being an integer equal to 2, wherein the method comprises at least the following steps:

grouping said P input signals by twos, one representing the real part, the other the imaginary part of a complex number, thereby defining at least one input vector, achieving filtering on said at least one input vector by passing through a Fourier space, thereby generating at least one complex output vector, the real portion and the imaginary portion of said at least output vector representing one of said Q output signals respectively, and wherein said at least one output vector is obtained in the following way:

a filtering operator is applied on each of said at least one input vectors, thereby giving several intermediate results, said intermediate results obtained by said filtering are summed in the Fourier space, the result of the summing of said intermediate results is subject to an inverse fast Fourier transform, thereby obtaining said output vector, and wherein:

P>2, an even integer such that P=2L, with L an integer,
Q=2,
$e_1(t), \ldots, e_{2k-1}(t), e_{2k}(t), \ldots, e_{2L}(t)$, are said P input signals,
$s_1(t)$, $s_2(t)$ are said Q output signals,
$\{a_k(t), b_k(t), c_k(t), d_k(t)\}$ is the set of filters defined such that $k \in [1$ to $L]$ and:

$$\begin{pmatrix} s_1(t) \\ s_2(t) \end{pmatrix} = \sum_{k=1}^{L} \begin{pmatrix} a_k(t) & d_k(t) \\ b_k(t) & c_k(t) \end{pmatrix} \otimes \begin{pmatrix} e_{2k-1}(t) \\ e_{2k}(t) \end{pmatrix}$$

wherein $\otimes$ is the convolution operator,
$\{e0_k(t)\}$, such that $k \in [1$ to $L]$ and $e0_k(t) = e_{2k-1}(t) + j \cdot e_2k(t)$, is the set of input vectors,
$s0(t)$ is said output vector such that $s0(t) = s_1(t) + j \cdot s_2(t)$,
said filtering operator associated with said source vector $e0_k(t)$ is such that:

$$S_k = \frac{F_k + H_k}{2} \cdot E_k + \frac{F-H}{2} \cdot \tilde{E}_k *$$

wherein:
* is the conjugate complex operator,
~ is the operator for inverting indices,
and $E_k(f) = FFT(e0_k(t)),$ $\sum_{k=1}^{L} S_k(f) = FFT(s0(t)),$ $F_k(f) = FFT[a_k(t) + j \cdot b_k(t)],$ $H_k(f) = FFT[c_k(t) - j \cdot d_k(t)]$ wherein FFT designates the fast Fourier transform operator.

3. The method according to claim 2, wherein, when the number of input signals is an uneven integer, a zero input signal is added so as to apply the method of claim 2 on an even number of input signals.

4. A method for processing a digital audio signal for achieving spatialization of sound, said method being applied by a digital signal processor (DSP) having libraries for calculating Fourier transforms from complex number space to complex number space, for digital processing of P input signals, P being an integer greater than or equal to 2, for filtering said P input signals by the convolution of sampled fast Fourier transforms (FFT), thereby obtaining Q output signals, Q being an integer greater than 2, wherein the method comprises at least the following steps:

grouping said P input signals by twos, one representing the real part, the other the imaginary part of a complex number, thereby defining at least one input vector, achieving filtering on said at least one input vector by passing through a Fourier space, thereby generating at least one complex output vector, the real portion and the imaginary portion of said at least one output vector representing one of said Q output signals respectively, and wherein said at least one output vector is obtained in the following way:

a filtering operator is applied on each of said at least one input vector, thereby giving several intermediate results, said intermediate results obtained by said filtering are summed in Fourier space, the result of the summing of the intermediate results is subject to an inverse fast Fourier transform, thereby obtaining said at least one output vector, and wherein:

P≥2 an even integer such that P=2L, with L an integer,
Q>2, an even integer such that Q=2M, with M an integer,
$e_1(t), \ldots e_{2k-1}(t), e_{2k}(t), \ldots e_{2L}(t)$, are said P input signals,
$s_1(t), \ldots s_{2m-1}(t), s_{2m}(t), \ldots s_{2M}(t)$, are said Q output signals,
$\{a_{m,k}(t), b_{m,k}(t), c_{m,k}(t), d_{m,k}(t)\}$ is the set of filters defined such as m∈[1 to M] and k∈[1 to L]
and $$\begin{pmatrix} s_{2m-1}(t) \\ s_{2m}(t) \end{pmatrix} = \sum_{k=1}^{L} \begin{pmatrix} a_{m,k}(t) & d_{m,k}(t) \\ b_{m,k}(t) & c_{m,k}(t) \end{pmatrix} \otimes \begin{pmatrix} e_{2k-1}(t) \\ e_{2k}(t) \end{pmatrix}$$

wherein ⊗ is the convolution operator,
$\{e0_k(t)\}$, such that k∈[1 to L] and $e0_k(t)=e_{2k-1}(t)+j \cdot e_{2k}(t)$, is the set of input vectors,
$\{s0_m(t)\}$, such that m∈[1 to M] and $s0_m(t)=s_{2m-1}(t)+j \cdot s_{2m}(t)$, is the set of output vectors,
said filtering operator associated with said source vector $e0_k(t)$ and with said at least one output vector $s0_m(t)$ is such that:

$$S_{m,k} = \frac{F_{m,k} + H_{m,k}}{2} \cdot E_k + \frac{F_{m,k} - H_{m,k}}{2} \cdot \tilde{E}_k *$$

wherein:
* is the conjugate complex operator,
~ is the operator for inverting indices,
and $$E_k(f) = FFT(e0_k(t)),$$

$$\sum_{k=1}^{L} S_{m,k}(f) = FFT(s0_m(t)),$$

$$F_{m,k}(f) = FFT[a_{m,k}(t) + j \cdot b_{m,k}(t)],$$

$$H_{m,k}(f) = FFT[c_{m,k}(t) - j \cdot d_{m,k}(t)],$$

wherein FFT designates the fast Fourier transform operator.

5. The method according to claim 4, wherein, when the number of output signals is an uneven integer, a zero output signal is added so as to apply the method of claim 4 on an even number of output signals.

6. The method according to any one of claims 1, 2 or 4, wherein the method is applied on sampled and windowed signals, by applying "overlap-save" or "overlap-add" in order to avoid artefacts on windowings.

7. The method according to claim 1, claim 2, or claim 4, wherein cross-fade methods are applied for avoiding artefacts upon changing filter.

8. A digital signal processor (DSP) having libraries for calculating Fourier transforms from complex number space to complex number space, and programmed for applying a method for digital processing of P input signals, P being an integer greater than or equal to 2, for filtering said P input signals by the convolution of sampled fast Fourier transforms (FFT), thereby obtaining Q output signals, Q being an integer greater than or equal to 2, wherein the method comprises at least the following steps:

grouping said P input signals by twos, one representing the real part, the other the imaginary part of a complex number, thereby defining at least one input vector, achieving filtering on said at least one input vector by passing through a Fourier space, thereby generating at least one complex output vector, the real portion and the imaginary portion of said or each of said at least one output vector representing one of said Q output signals respectively, and wherein said at least one output vector is obtained in the following way:

(1) a filtering operator is applied on said input vector, in the case when P=2 thereby giving a result or if necessary, according to another alternative, in the case when P>2, on each of said input vectors, thereby giving several intermediate results, (2) in the case when P>2, said intermediate results obtained by said filtering are summed in the Fourier space, (3) the result of step (1) or (2) is subject to an inverse fast Fourier transform, thereby obtaining said output vector.

* * * * *